(12) United States Patent
Sasagawa et al.

(10) Patent No.: US 11,571,844 B2
(45) Date of Patent: Feb. 7, 2023

(54) INJECTION MOLDING DEVICE, INJECTION MOLDING SYSTEM, AND THREE-DIMENSIONAL SHAPING DEVICE

(71) Applicant: SEIKO EPSON CORPORATION, Tokyo (JP)

(72) Inventors: Kakeru Sasagawa, Matsumoto (JP); Kei Yokota, Matsumoto (JP); Kenta Anegawa, Matsumoto (JP); Seiichiro Yamashita, Azumino (JP); Yuji Shinbaru, Matsumoto (JP); Kazunobu Maruyama, Shiojiri (JP); Daichi Miyashita, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/070,272

(22) Filed: Oct. 14, 2020

(65) Prior Publication Data

US 2021/0114274 A1  Apr. 22, 2021

(30) Foreign Application Priority Data

Oct. 17, 2019 (JP) .............................. JP2019-190023

(51) Int. Cl.
  *B29C 45/72* (2006.01)
  *B33Y 30/00* (2015.01)
  *B29C 45/03* (2006.01)
  *B29C 45/42* (2006.01)
  *B29C 64/295* (2017.01)
  *B29C 45/00* (2006.01)

(52) U.S. Cl.
  CPC .............. *B29C 45/72* (2013.01); *B29C 45/03* (2013.01); *B29C 45/42* (2013.01); *B29C 64/295* (2017.08); *B33Y 30/00* (2014.12); *B29C 2045/0096* (2013.01)

(58) Field of Classification Search
  CPC ....... B29C 45/72; B29C 64/295; B29C 45/03; B29C 45/42; B33Y 30/00
  See application file for complete search history.

(56) References Cited

U.S. PATENT DOCUMENTS 3,875,683 A * 4/1975 Waters .................... F26B 21/10
  34/174
5,371,931 A * 12/1994 Kawana .................. B29C 37/00
  29/793

(Continued)

FOREIGN PATENT DOCUMENTS

| CN | 201098981 | 8/2008 |
| CN | 104842528 | 8/2015 |
| CN | 208438685 | 1/2019 |

(Continued)

*Primary Examiner* — Joseph S Del Sole
*Assistant Examiner* — John Robitaille
(74) *Attorney, Agent, or Firm* — Workman Nydegger

(57) ABSTRACT

An injection molding device includes: a material storage unit storing a material; a drive motor; a plasticization unit including a rotor that rotates by rotation of the drive motor, a barrel facing the rotor, and a heater, and configured to plasticize and flow out the material supplied from the material storage unit; a nozzle through which the material after plasticization is injected toward a mold from the plasticization unit; and a material drying unit configured to collect waste heat of the drive motor and dry the material in the material storage unit.

6 Claims, 12 Drawing Sheets

(56) References Cited

U.S. PATENT DOCUMENTS

2003/0082265 A1* 5/2003 Bauer .................. B29C 48/911
                                                                425/551
2010/0320633 A1* 12/2010 Kamigauchi ......... B29C 48/276
                                                                264/40.6

FOREIGN PATENT DOCUMENTS

| JP | S60-194510  | 12/1985 |
| JP | 09-123232   | 5/1997  |
| JP | 2005-306028 | 11/2005 |
| JP | 2008-036979 | 2/2008  |
| JP | 2011-020378 | 2/2011  |
| JP | 2015-150809 | 8/2015  |
| JP | 2019-081265 | 5/2019  |

* cited by examiner though the material is dried using the dryer, the material may
INJECTION MOLDING DEVICE, INJECTION MOLDING SYSTEM, AND THREE-DIMENSIONAL SHAPING DEVICE The present application is based on, and claims priority from JP Application Serial Number 2019-190023, filed Oct. 17, 2019, the disclosure of which is hereby incorporated by reference herein in its entirety.

BACKGROUND

1. Technical Field

The present disclosure relates to an injection molding device, an injection molding system, and a three-dimensional shaping device.

2. Related Art

In an injection molding device disclosed in JP-A-2011-20378, a pellet-shaped material is melted using a rotor having a spiral groove formed on an end surface, and injection molding is performed. The pellet-shaped material is charged into a hopper attached to a casing and supplied from the hopper to the spiral groove of the rotor.

Generally, in the injection molding, in order to enhance the quality of a molded object, the material is previously dried using a dryer. Then, when molding is performed using the injection molding device, a user charges the dried material into the hopper. However, in the related art, since no device for drying the material is provided in the hopper, even though the material is dried using the dryer, the material may absorb moisture in the air in the hopper, which affects the quality of the molded object.

SUMMARY

According to one aspect of the present disclosure, an injection molding device is provided. The injection molding device includes: a material storage unit storing a material; a drive motor; a plasticization unit including a rotor that rotates by rotation of the drive motor, a barrel facing the rotor, and a heater, and configured to plasticize and flow out the material supplied from the material storage unit; a nozzle through which the material after plasticization is injected toward a mold from the plasticization unit; and a material drying unit configured to collect waste heat of the drive motor and dry the material in the material storage unit.

DESCRIPTION OF EXEMPLARY EMBODIMENTS

A. First Embodiment

Figure 1:
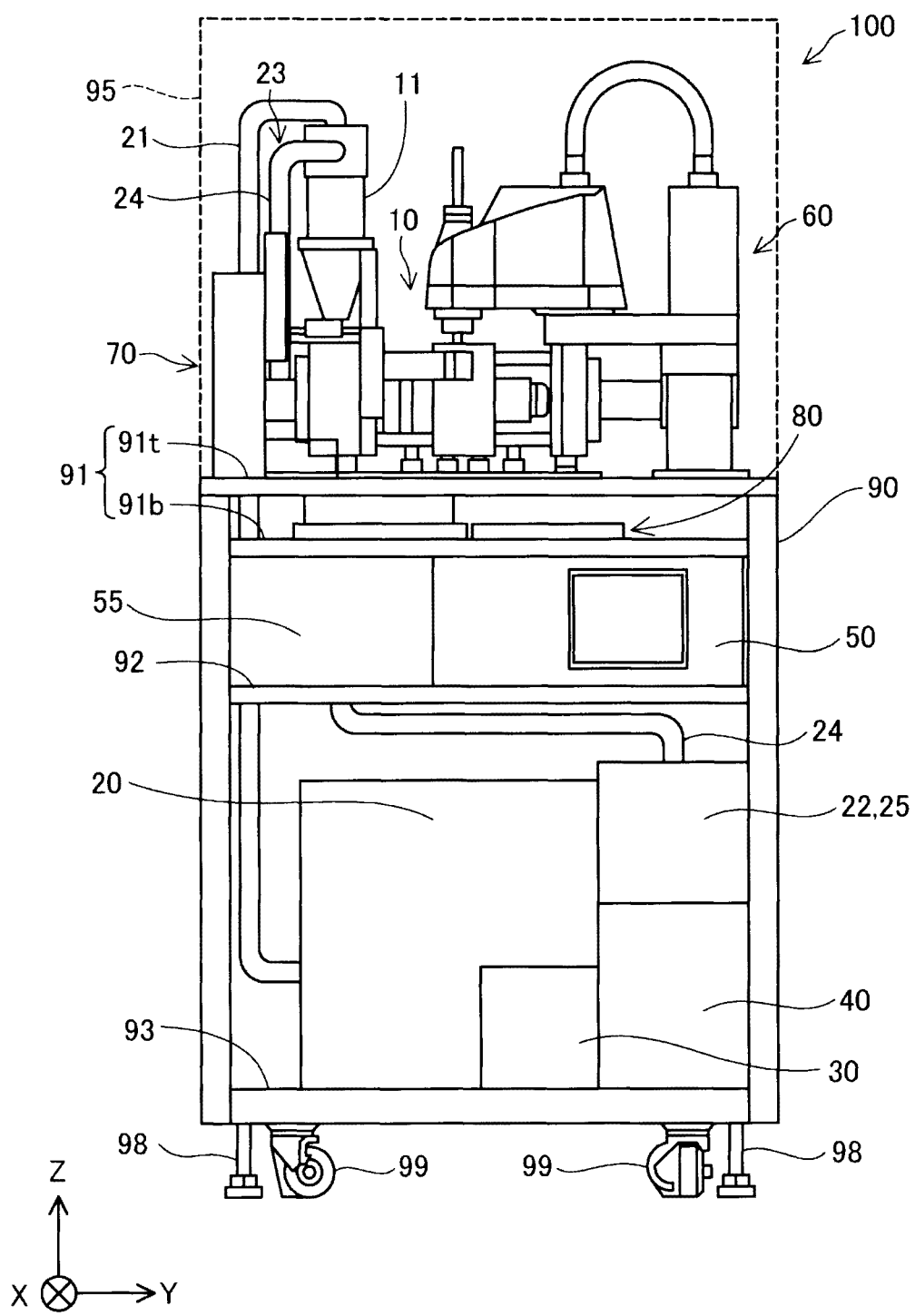
FIG. 1 is a front view showing a schematic configuration of an injection molding system according to a first embodiment.
Figure 2:
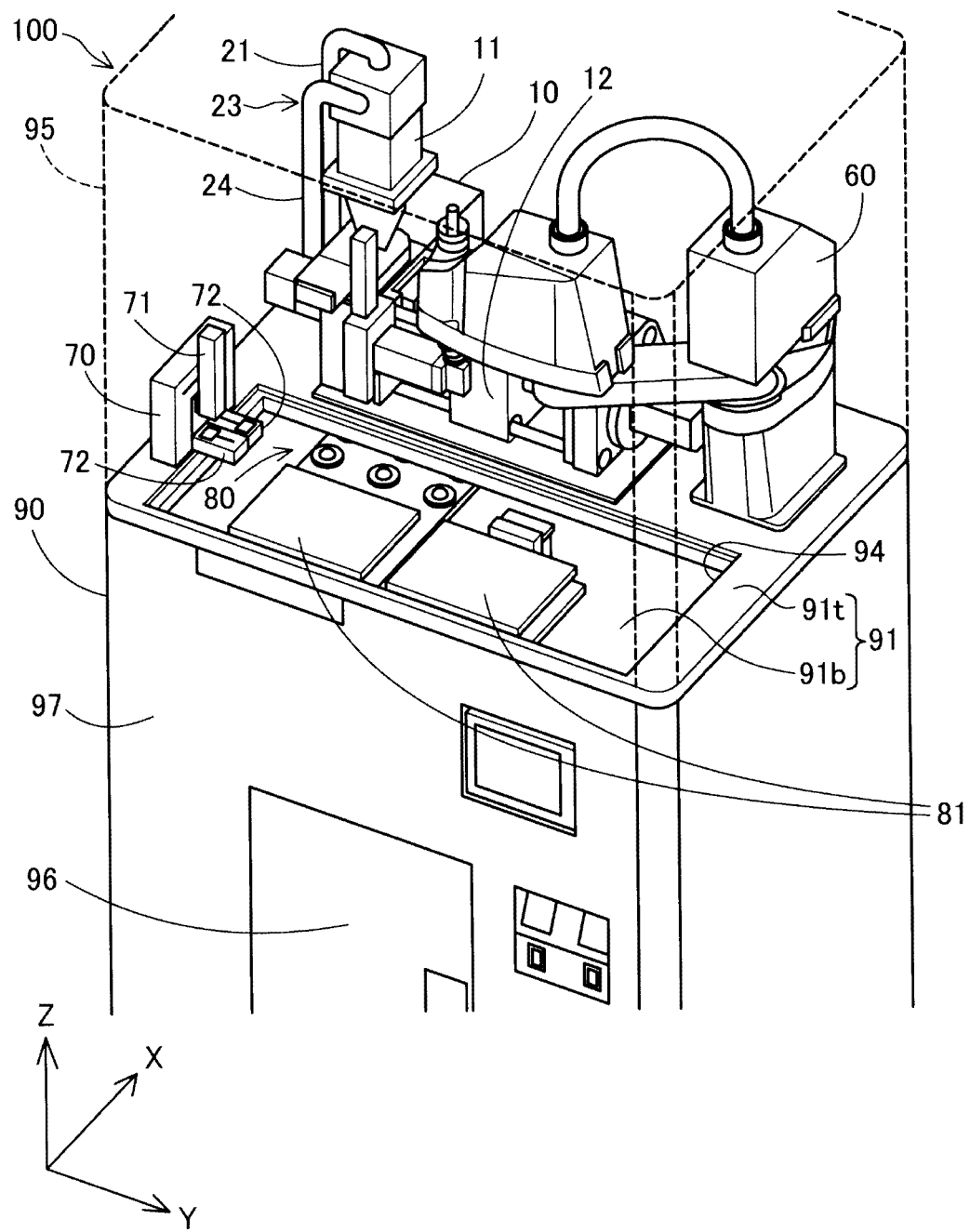
FIG. 2 is a first perspective view of the injection molding system.
Figure 3:
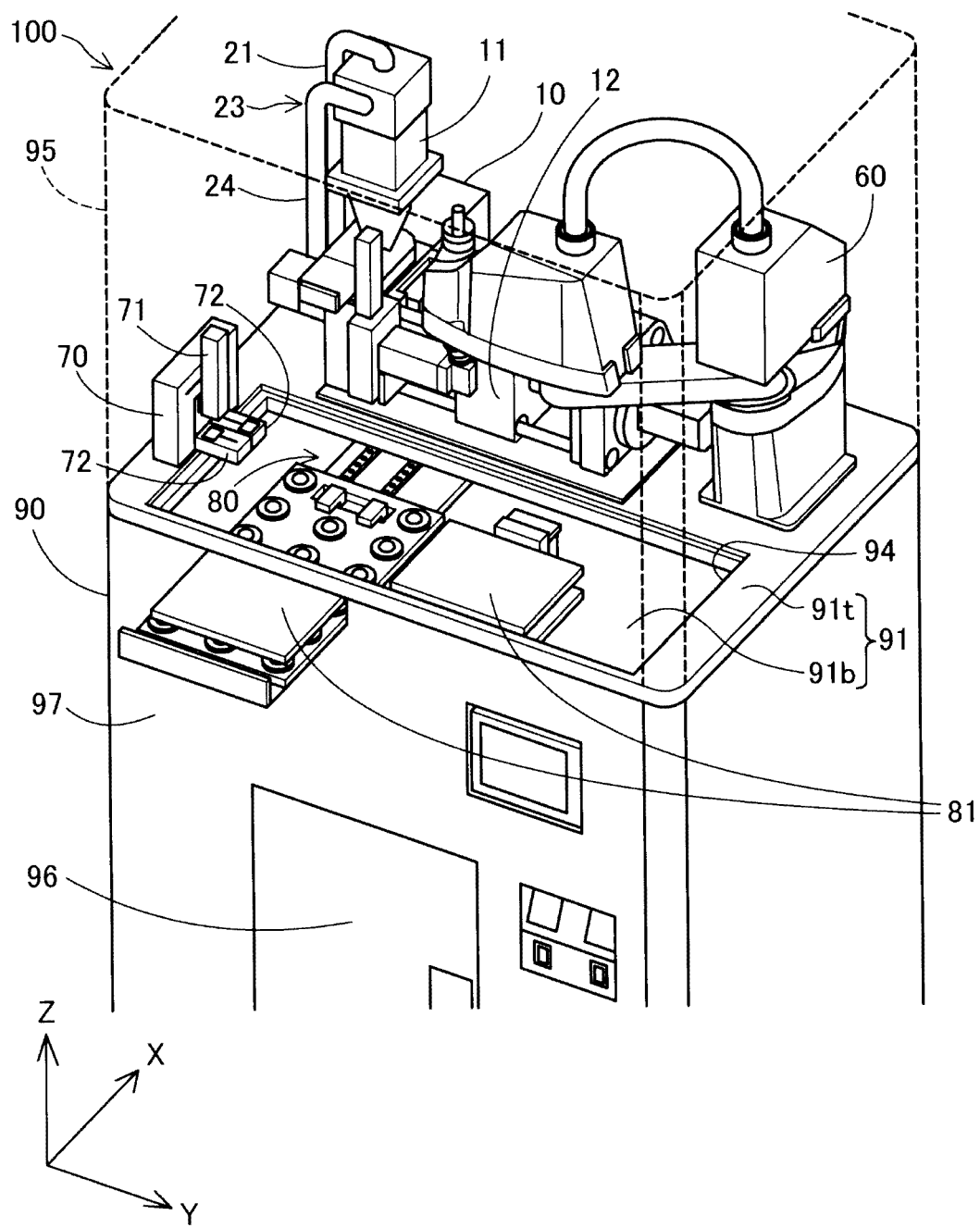
FIG. 3 is a second perspective view of the injection molding system.

FIG. 1 is a front view showing a schematic configuration of an injection molding system according to a first embodiment. FIGS. 2 and 3 are perspective views of the injection molding system. In FIG. 1, directions of X, Y, and Z orthogonal to each other are shown. The X direction and the Y direction are directions along a horizontal direction, and the Z direction is a direction opposite to a vertical direction. Each direction shown in FIG. 1 corresponds to each direction shown in FIG. 2 and subsequent figures.

As shown in FIGS. 1 and 2, an injection molding system 100 includes a housing 90, an injection molding device 10, a material supply device 20, a dryer 30, a temperature controller 40, a controller 50, and a robot 60, an inspection device 70, a moving mechanism 80, and a power supply unit 55 that supplies power to these devices. FIG. 2 shows a state in which a side surface cover 97 is attached to a side surface of the housing 90, and FIG. 1 shows a state in which the side surface cover 97 is removed. The housing 90 includes an upper cover 95 that covers an upper side of a first base 91 to be described later. In FIGS. 1 to 3, the upper cover 95 is indicated by a broken line. The upper cover 95 is preferably made of transparent glass or resin so that an internal work situation can be visually recognized from the outside. All or a portion of the upper cover 95 may be configured to be removable from the housing 90. In addition, the injection molding system 100 may not include the side surface cover 97.

A mold 12 is attached to the injection molding device 10, and the injection molding device 10 is a device for molding a molded object by injecting and implanting a molten material into the mold 12. The mold 12 attached to the injection molding device 10 may be made of metal or may be made of resin. The mold 12 is also simply referred to as a die. Although details of the injection molding device 10 will be described later, the injection molding device 10 is provided with a drive motor for driving each part of the injection molding device 10.

The material supply device 20 is a device that stores a material to be used in the injection molding device 10 and supplies the material to the injection molding device 10. In the present embodiment, a resin material in a form of pellets is charged from the outside to the material supply device 20. As shown in FIG. 2, the side surface cover 97 is provided with a door 96 for charging the material to the material supply device 20. The material stored in the material supply device 20 is dried by the dryer 30 coupled to the material supply device 20. The material supply device 20 and the injection molding device 10 are coupled by a pipe 21. The material supply device 20 includes a pneumatic pump 22, and the material dried by the dryer 30 is pumped from the material supply device 20 into the pipe 21 by compressed air supplied from the pneumatic pump 22, and is supplied to a material storage unit 11 provided in the injection molding device 10. As the dryer 30, various dryers such as a hot air dryer, a dehumidifying hot air dryer, and a reduced pressure heat transfer dryer can be used.

The material storage unit 11 is a container in which the material to be supplied to the injection molding device 10 is temporarily stored. The material storage unit 11 is also referred to as a hopper. A material drying unit 23 is coupled to the material storage unit 11. The material drying unit 23 collects waste heat of a drive motor provided in the injection molding device 10, and dries the material in the material storage unit 11. The material drying unit 23 does not need to collect all of the waste heat of the drive motor, and may collect a part of the waste heat. In the present embodiment, the material drying unit 23 includes a flow path 24 and a blowing mechanism 25. At least a part of the flow path 24 is in contact with the drive motor provided in the injection molding device 10, and the flow path 24 communicates with an inside of the material storage unit 11. The blowing mechanism 25 supplies air to the flow path 24, and feeds the dried air warmed by the waste heat of the drive motor into the material storage unit 11. In the present embodiment, the pneumatic pump 22 also serves as the blowing mechanism 25. With this configuration, the material drying unit 23 causes the compressed air sent from the pneumatic pump 22 to flow through the flow path 24 so as to be in contact with the drive motor, and supplies the compressed air warmed by the waste heat of the drive motor to the material storage unit 11 to dry the material in the material storage unit 11. A fan may be used as the blowing mechanism 25.

The temperature controller 40 adjusts a temperature of the mold 12 provided in the injection molding device 10. The temperature controller 40 and the mold 12 are coupled by a pipe (not shown), and the temperature is adjusted by circulating a heat medium such as water or oil in the pipe.

The robot 60 is a device for taking the molded object out from the mold 12 and placing the molded object on the inspection device 70 and a tray 81 for transporting the molded object. The robot 60 of the present embodiment is configured as a horizontal articulated robot having a robot controller built therein. A hand of the robot 60 is provided with a vacuum suction device, and the robot 60 uses the vacuum suction device to vacuum-suck and take out the molded object from the mold 12. The vacuum suction device is driven by a vacuum generator coupled to the pneumatic pump 22. The robot 60 is not limited to a horizontal articulated robot, and may be implemented by a vertical articulated robot having a plurality of axes. The robot controller may not be built in the robot 60, but may be disposed in any part of the housing 90, for example, a second base 92 to be described later.

The inspection device 70 is a device for inspecting a molded object taken out from the mold 12. In the present embodiment, the inspection device 70 includes one camera 71 and two rows of conveyance mechanisms 72. Each of the conveyance mechanisms 72 is reciprocally movable along the Y direction, and the camera 71 is reciprocally movable along the X direction. Operations of the conveyance mechanism 72 and the camera 71 are controlled by the controller 50. Molded objects are alternately placed on each of the conveyance mechanisms 72 by the robot 60. The molded objects placed on the respective conveyance mechanisms 72 are alternately conveyed to an imaging enabled position of the camera 71. The camera 71 captures an image of the molded object conveyed to an imaging position by each conveyance mechanism 72 while reciprocating in the X direction. The inspection device 70 inspects an appearance of the molded object based on the captured image.

The moving mechanism 80 is a mechanism for moving the tray 81 on which the molded object is placed by the robot 60 to a take-out enabled position at which the molded object is taken out from the outside. The moving mechanism 80 is controlled by the controller 50. The moving mechanism 80 includes slide bases on which the tray 81 is placed and which move parallel to the X direction on a rail, and a fixing base which is provided adjacently to the slide bases and moves the tray 81 between the slide bases in parallel to the Y direction. A ball roller is provided in an entire range in which the tray 81 moves on the slide base and the fixing base. The moving mechanism 80 includes an actuator for moving the tray 81 on the slide table or the fixing base, and an actuator for moving the slide base on the rail. In the present embodiment, the robot 60 first conveys the molded object taken out from the injection molding device 10 to the inspection device 70, and places the molded object inspected by the inspection device 70 on the tray 81 set in the moving mechanism 80. When the molded object is placed on the tray 81, the moving mechanism 80 conveys the tray 81 to a position where the tray 81 can be taken out from the outside as shown in FIG. 3. Two trays 81 are set in the moving mechanism 80. The moving mechanism 80 moves the trays 81 to a position where the trays 81 can be taken out alternately by moving the trays 81 on the slide base and the fixing base in a predetermined path. The tray 81 may be referred to as a pallet, and the moving mechanism 80 may be referred to as a pallet changer.

The controller 50 is a device that performs overall control of the injection molding device 10, the inspection device 70, the robot 60, and the moving mechanism 80. In the present embodiment, the controller 50 is implemented by a programmable logic controller (PLC). The controller 50 implemented by the PLC is programmed by a language such as a ladder language to control linkage operations of each device such as molding by the injection molding device 10, taking-out of the molded object by the robot 60, inspection of the molded object by the inspection device 70, and conveyance of the molded object by the moving mechanism 80.

All of the devices described above, that is, the injection molding device 10, the material supply device 20, and the pneumatic pump 22, the dryer 30, the temperature controller 40, the controller 50, the power supply unit 55, the inspection device 70, and the moving mechanism 80 are all provided in the housing 90.

The housing 90 includes casters 99 at corners of a bottom surface thereof. Therefore, the injection molding system 100 is configured to be freely movable. In the present embodiment, a bolt-type stopper 98 is provided on the bottom surface of the housing 90 so as to be adjacent to the caster 99. A user can fix the injection molding system 100 to an installation location by using the stopper 98.

The housing 90 includes the first base 91, the second base 92, and a third base 93. The first base 91 is a base disposed on an uppermost portion of the housing 90. The second base 92 is a base disposed below the first base. The third base 93 is a base disposed below the second base.

In the present embodiment, the injection molding device 10, the robot 60, the inspection device 70, and the moving mechanism 80 are disposed on the first base 91. The controller 50 is disposed on the second base 92. In the present embodiment, the power supply unit 55 is also disposed on the second base 92. The material supply device 20, the temperature controller 40, and the dryer 30 are disposed on the third base 93. In the present embodiment, the pneumatic pump 22 is also disposed on the third base 93.

In the present embodiment, the first base 91 includes an upper stage portion 91t and a lower stage portion 91b positioned below the upper stage portion 91t. The injection molding device 10, the robot 60, and the inspection device 70 are disposed in the upper stage portion 91t. The moving mechanism 80 is disposed in the lower stage portion 91b.

Figure 4:
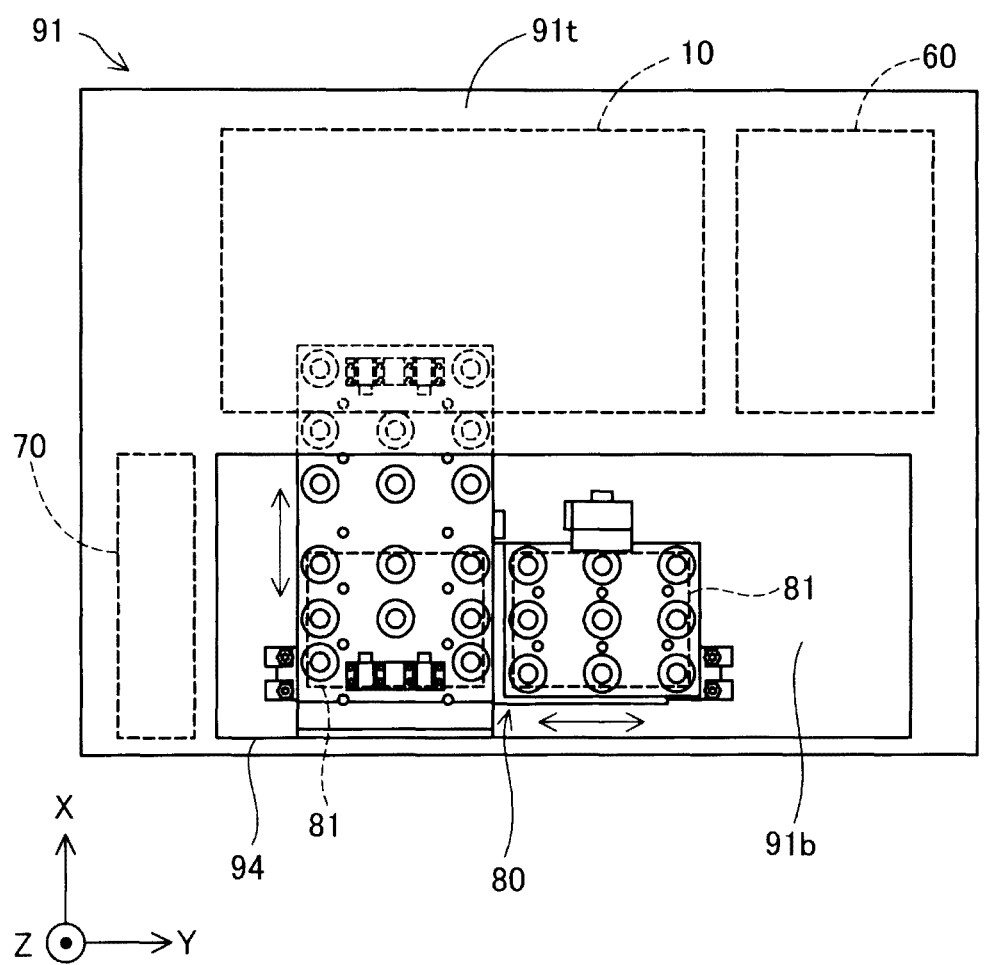
FIG. 4 is a diagram schematically showing an arrangement of each device in a first base.

FIG. 4 is a diagram schematically showing an arrangement of each device in the first base 91. In the present embodiment, when the housing 90 is viewed from above, a region on the first base 91 is largely divided into a +X direction side region and a −X direction side region. The injection molding device 10 and the robot 60 are disposed in the +X direction side region, and the inspection device 70 and a large part of the moving mechanism 80 are disposed in the −X direction side region. An opening portion 94 is formed in the −X direction side region of the upper stage portion 91t of the first base 91. The lower stage portion 91b is exposed from the opening portion 94. In the present embodiment, the phrase "the robot 60 is disposed" means that a base portion that supports an arm of the robot 60 is disposed.

In the present embodiment, when the housing 90 is viewed from above, at least one of the injection molding device 10, the robot 60, and the inspection device 70 is disposed in the upper stage portion 91t so as to overlap a part of the moving mechanism 80 disposed in the lower stage portion 91b. In the present embodiment, the injection molding device 10 overlaps a part of the moving mechanism 80. Therefore, the tray 81 conveyed by the moving mechanism 80 is movable in the lower stage portion 91b so as to enter a lower portion of the injection molding device 10. In another embodiment, the robot 60 or the inspection device 70 may be disposed in the upper stage portion 91t so as to overlap a part of the moving mechanism 80. All of the injection molding device 10, the robot 60, and the inspection device 70 may be disposed in the upper stage portion 91t so as to overlap a part of the moving mechanism 80.

In the present embodiment, when the housing 90 is viewed from above, the inspection device 70, the injection molding device 10, and the robot 60 are disposed in this order substantially in a clockwise direction around the moving mechanism 80. In another embodiment, the inspection device 70, the injection molding device 10, and the robot 60 may be disposed in this order in a counterclockwise direction.

Figure 5:
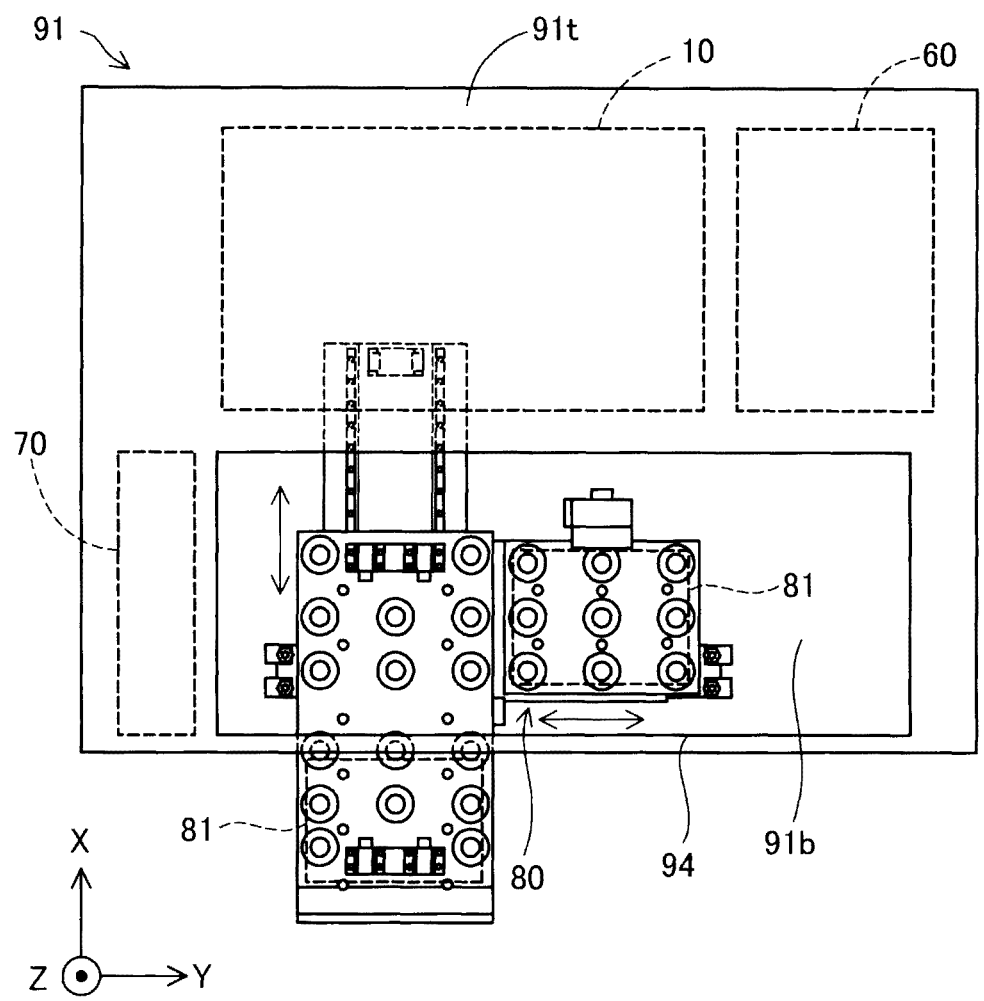
FIG. 5 is a diagram showing a take-out position of a tray.

FIG. 5 is a diagram showing a take-out position of the tray 81. The moving mechanism 80 discharges the tray 81 to the outside of the housing 90. An external position is the take-out position of the molded object. In the present embodiment, when the housing 90 is viewed from above, an arrangement region where the inspection device 70, the injection molding device 10, and the robot 60 are arranged does not overlap the take-out position of the molded object.

Figure 6:
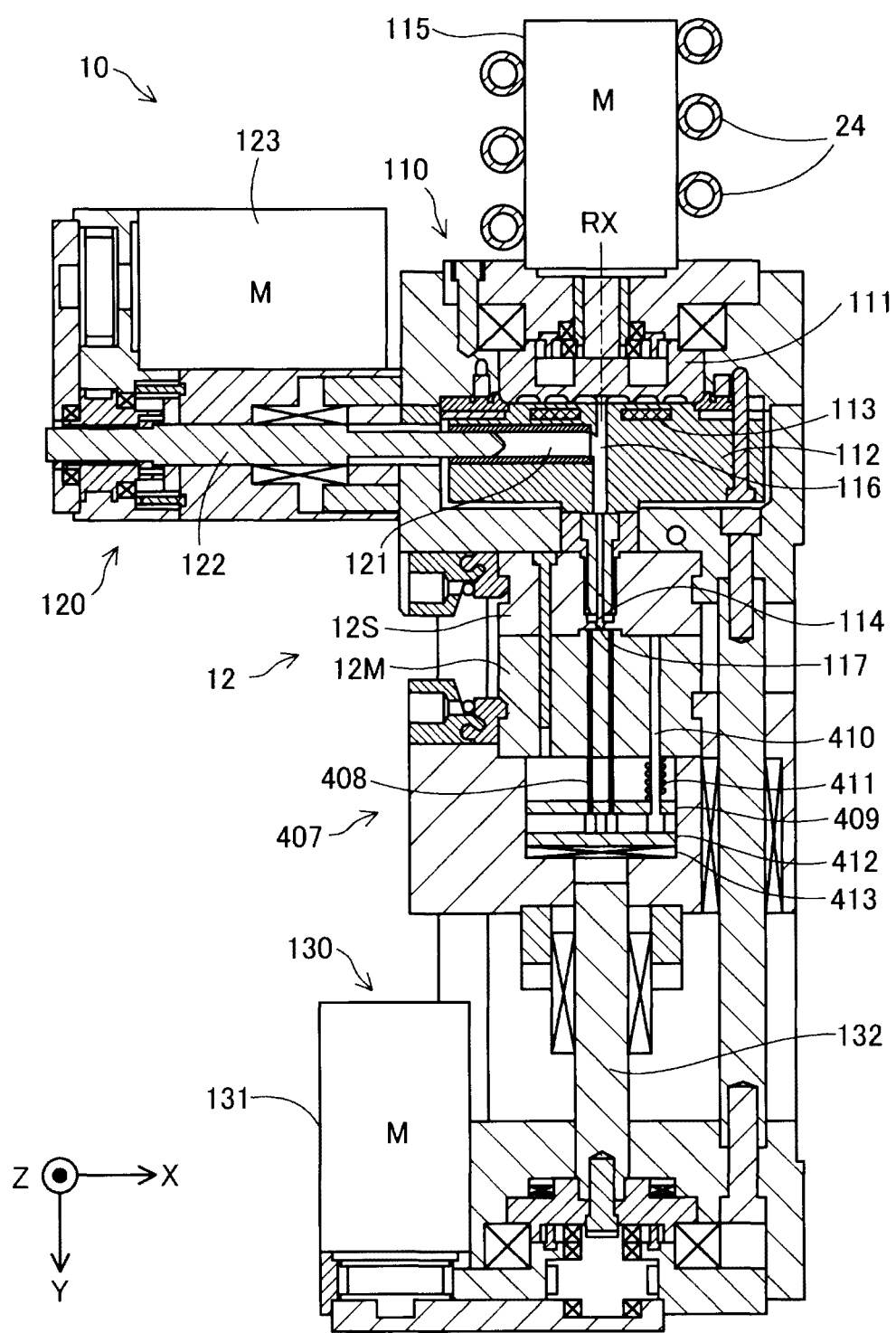
FIG. 6 is a diagram showing a schematic configuration of an injection molding device.

FIG. 6 is a diagram showing a schematic configuration of the injection molding device 10. The injection molding device 10 includes a plasticization unit 110, an injection control mechanism 120, the mold 12, and a mold clamping device 130. The injection molding system 100 includes a screw drive unit 115, a plunger drive unit 123, and a mold drive unit 131, each of which is implemented by a drive motor in order to drive these units.

The plasticization unit 110 includes a rotor 111, a barrel 112, a heater 113, and a nozzle 114. The rotor 111 is driven to rotate about a rotation axis RX by the screw drive unit 115. A communication hole 116 is formed at a center of the barrel 112. An injection cylinder 121 to be described later is coupled to the communication hole 116. Rotation of the rotor 111 by the screw drive unit 115 and heating by the heater 113 are controlled by the controller 50.

A part of the flow path 24 is disposed around the screw drive unit 115 so as to be in contact with the screw drive unit 115. In the present embodiment, the flow path 24 is disposed spirally around the screw drive unit 115. In the description, the term "contact" means a direct contact, an indirect contact via a thermally conductive body or substance, or a contact by being provided within an object to be contacted. Therefore, the flow path 24 may be indirectly in contact with the screw drive unit 115, or may be provided inside the screw drive unit 115.

Figure 7:
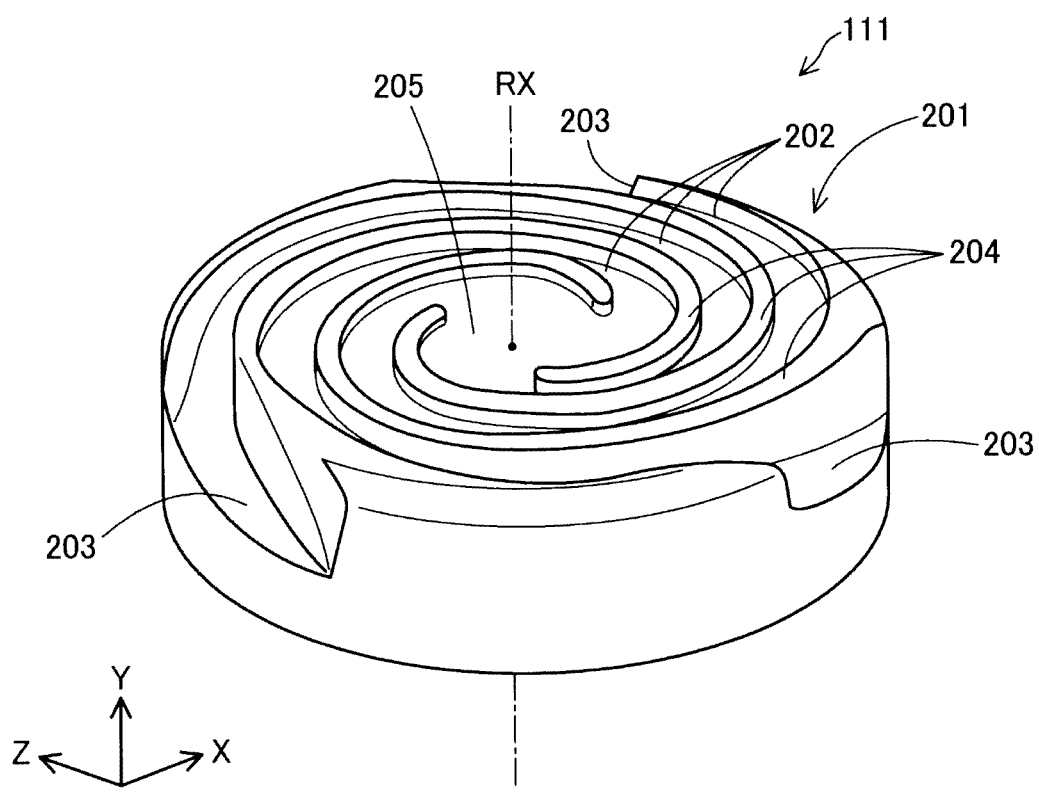
FIG. 7 is a perspective view showing a schematic configuration of a rotor.

FIG. 7 is a perspective view showing a schematic configuration of the rotor 111. The rotor 111 has a substantially columnar shape whose height in an axial direction which is a direction along a central axis of the rotor 111 is smaller than a diameter. The rotor 111 in the present embodiment is also referred to as a flat screw. In an end surface 201 of the rotor 111 facing the barrel 112, spiral groove portions 202 are formed with a flat central portion 205 being the center. The groove portion 202 communicates with a material inlet port 203 formed on a side surface of the rotor 111. The material supplied from the material storage unit 11 is supplied to the groove portions 202 through the material inlet port 203. The groove portions 202 are formed by being separated by ridge portions 204. In FIG. 7, an example in which three groove portions 202 are formed is shown, but the number of the groove portions 202 may be one or two or more.

Figure 8:
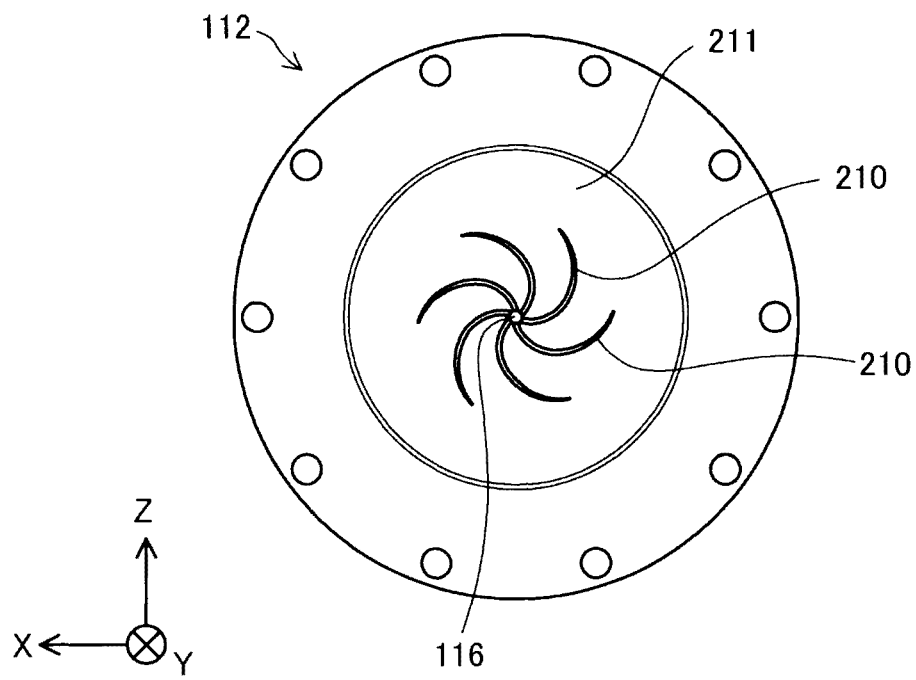
FIG. 8 is a schematic plan view of a barrel.

FIG. 8 is a schematic plan view of the barrel 112. The barrel 112 has a facing surface 211 that faces the end surface 201 of the rotor 111. The communication hole 116 is formed at a center of the facing surface 211. A plurality of guide grooves 210 that are coupled to the communication hole 116 and extend spirally from the communication hole 116 toward an outer periphery are formed in the facing surface 211. While the material supplied to the groove portions 202 of the rotor 111 is melted between the rotor 111 and the barrel 112 by the rotation of the rotor 111 and the heating of the heater 113, the material flows along the groove portions 202 and the guide grooves 210 by the rotation of the rotor 111, and is guided to the central portion 205 of the rotor 111. The material flowing into the central portion 205 is guided from the communication hole 116 provided at the center of the barrel 112 to the injection control mechanism 120.

The injection control mechanism 120 includes an injection cylinder 121 and a plunger 122. The injection control mechanism 120 has a function of injecting and implanting a molten material in the injection cylinder 121 into a cavity 117 described later. The injection control mechanism 120 controls an injection amount of the molten material from the nozzle 114 under the control of the controller 50. The injection cylinder 121 is a substantially cylindrical member coupled to the communication hole 116 of the barrel 112, and includes the plunger 122 therein. The plunger 122 slides inside the injection cylinder 121 and pumps the molten material in the injection cylinder 121 to the nozzle 114 included in the plasticization unit 110. The plunger 122 is driven by the plunger drive unit 123.

The mold 12 includes a movable part 12M and a fixed part 12S. The movable part 12M and the fixed part 12S are provided to face each other, and the cavity 117 that is space corresponding to a shape of a molded object is formed between the movable part 12M and the fixed part 12S. The molten material is pumped by the injection control mechanism 120 and injected from the nozzle 114 to the cavity 117.

The mold clamping device 130 has a function of opening and closing the movable part 12M and the fixed part 12S. The mold clamping device 130 rotates a ball screw 132 by driving the mold drive unit 131 under the control of the controller 50, and moves the movable part 12M coupled to the ball screw 132 with respect to the fixed part 12S to open and close the mold 12. That is, the fixed part 12S is stationary in the injection molding system 100, and the movable part 12M moves relative to the stationary fixed part 12S to open and close the mold 12.

The movable part 12M is provided with an extrusion mechanism 407 for releasing a molded object from the mold 12. The extrusion mechanism 407 includes an ejector pin 408, a support plate 409, a support rod 410, a spring 411, an extrusion plate 412, and a thrust bearing 413.

The ejector pin 408 is a rod-shaped member for extruding the molded object molded in the cavity 117. The ejector pin 408 passes through the movable part 12M and be inserted into the cavity 117. The support plate 409 is a plate member that supports the ejector pin 408. The ejector pin 408 is fixed to the support plate 409. The support rod 410 is fixed to the support plate 409 and is inserted into a through hole formed in the movable part 12M. The spring 411 is disposed in a space between the movable part 12M and the support plate 409, and is inserted into the support rod 410. The spring 411 biases the support plate 409 so that a head of the ejector pin 408 forms a part of a wall surface of the cavity 117 during molding. The extrusion plate 412 is fixed to the support plate 409. The thrust bearing 413 is attached to the extrusion plate 412, and a head of the ball screw 132 is provided so as to not damage the extrusion plate 412. A thrust sliding bearing or the like may be used instead of the thrust bearing 413.

Figure 9:
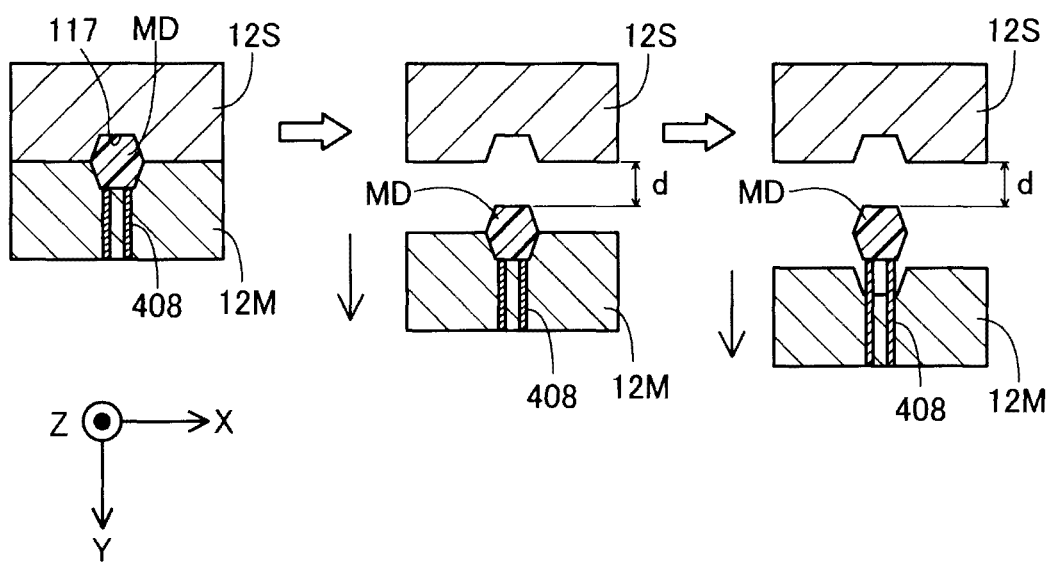
FIG. 9 is a diagram showing movement of a mold.

FIG. 9 is a diagram showing movement of the mold 12. When the mold clamping device 130 shown in FIG. 6 drives the ball screw 132 and moves the movable part 12M relative to the fixed part 12S in the +Y direction by a predetermined amount d as shown in FIG. 9, an end portion of the ball screw 132 on a −Y direction side comes into contact with the thrust bearing 413, and the ejector pin 408 does not move further in the +Y direction. In this state, when the movable part 12M is further moved in a +Y direction, only the movable part 12M moves in the +Y direction in a state in which the ejector pin 408 is in contact with the molded object MD, so that the ejector pin 408 relatively extrudes the molded object MD in the cavity 117, and the molded object MD is released from the movable part 12M. That is, in the present embodiment, the molded object MD is released from the movable part 12M at a position where the molded object MD is stationary without moving and protruding the ejector pin 408 itself. The robot 60 takes the molded object MD released in such a manner out from the injection molding device 10.

According to the injection molding system. 100 of the present embodiment described above, since the material drying unit 23 can collect the waste heat of the drive motor and dry the material in the material storage unit 11 by the waste heat, it is possible to prevent the material in the material storage unit 11 from absorbing moisture in the air even though the material is dried by the dryer 30. Therefore, the quality of the molded object can be enhanced. In the present embodiment, since the waste heat of the drive motor provided in the injection molding device 10 warms the air for drying the material, it is not necessary to provide a new heat source. Therefore, it is possible to prevent an increase in power consumption of the injection molding system 100.

In addition, since the drive motor can be cooled by using the waste heat of the drive motor, it is possible to prevent deterioration and performance degradation of the drive motor. In addition, for example, when the heater 113 of the plasticization unit 110 is cooled, there is a possibility that a discharge failure occurs due to a change in a plasticized state of the material, but such a problem does not occur even if the drive motor is cooled. Therefore, according to the present embodiment, both energy saving and securing of shaping quality can be implemented by drying the material using the waste heat of the drive motor.

In the present embodiment, since the material drying unit 23 includes the flow path 24 configured to be at least partially in contact with the drive motor and communicate with the inside of the material storage unit 11, and the blowing mechanism 25 configured to supply air to the flow path 24 and feed the dried air warmed by the waste heat of the drive motor into the material storage unit 11, the material in the material storage unit 11 can be efficiently dried.

In the injection molding system 100 of the present embodiment, not only the injection molding device 10, but also the material supply device 20, the temperature controller 40, the dryer 30, and the controller 50 necessary for operating the injection molding device 10 are disposed in one housing 90, and the housing 90 is configured to be movable by the casters 99. Therefore, the injection molding device 10 can be freely moved in a facility of a factory or the like, and it is possible to prevent a restriction on the place where the injection molding device 10 can be used.

According to the present embodiment, since the injection molding system 100 is further provided with each device used in a post-process after the injection molding such as the robot 60 for taking out the molded object from the mold 12, the inspection device 70 for inspecting the molded object, and the moving mechanism 80 for moving the tray 81 on which the molded object is placed to the take-out enabled position where the tray 81 is taken out from the outside, the convenience of the user can be improved.

In the present embodiment, when the housing 90 is viewed from above, the inspection device 70, the injection molding device 10, and the robot 60 are disposed in the housing 90 clockwise or counterclockwise in this order. Therefore, the conveyance of the molded object by the robot 60 between the injection molding device 10 and the inspection device 70 can be efficiently performed.

In the present embodiment, when the housing 90 is viewed from above, the arrangement region where the inspection device 70, the injection molding device 10, and the robot 60 are disposed does not overlap the take-out position of the molded object. Therefore, it is possible to prevent an operation of taking out the molded object by the user from affecting an operation of the robot 60.

In the present embodiment, the material supply device 20 includes the pneumatic pump 22 that generates the compressed air, and the material is supplied to the injection molding device 10 by the compressed air, or the material in the material storage unit 11 is dried by the compressed air. Therefore, the injection molding system can be operated without receiving the supply of the compressed air from the facility of the factory. As a result, a degree of freedom in installation of the injection molding system 100 can be increased. Further, in the present embodiment, since the temperature controller 40 adjusts a temperature by circulating the heat medium between the temperature controller 40 and the mold 12, it is not necessary to receive the supply of water from the facility of the factory. Therefore, the degree of freedom in installation of the injection molding system 100 can be further increased.

Figure 10:
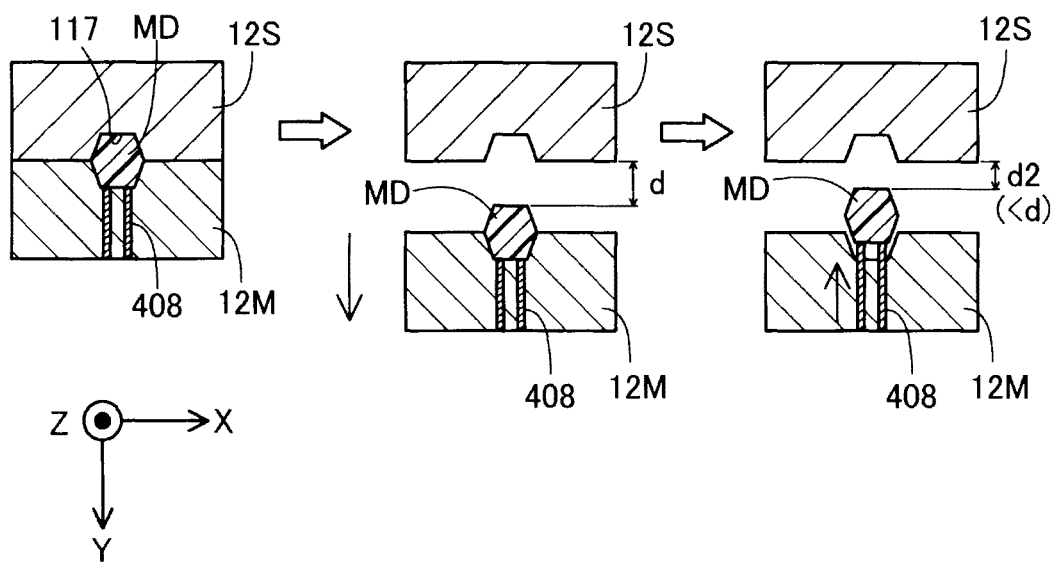
FIG. 10 is a diagram showing movement of the mold according to a comparative example.

In the present embodiment, instead of the movement of the ejector pin 408 itself, the ejector pin 408 protrudes from the movable part 12M toward the fixed part 12S by the movement of the movable part 12M relative to the fixed part 12S. In contrast, in a comparative example shown in FIG. 10, after moving the movable part 12M relative to the fixed part 12S in the +Y direction by the predetermined amount d, the movable part 12M is stopped, and the ejector pin 408 is moved in a −Y direction. Therefore, the molded object MD also moves with the movement of the ejector pin 408, and a distance between the fixed part 12S and the molded object MD is a distance d2 smaller than a moving distance d of the movable part 12M. That is, when the ejector pin 408 itself is moved, the possibility that a position where the molded object MD is released varies for each molding is increased. However, in the present embodiment, as described above, since the mold release is performed by moving the movable part 12M instead of the ejector pin 408, the molded object MD can be released from the movable part 12M without changing a position of the molded object MD. Therefore, it is possible to accurately take out the molded object by the robot 60.

In the present embodiment, since the material is melted using the thin rotor 111 in which the groove portions 202 are provided on the end surface, the injection molding device 10 can be downsized. Therefore, the injection molding system 100 can be formed compactly.

B. Second Embodiment

Figure 11:
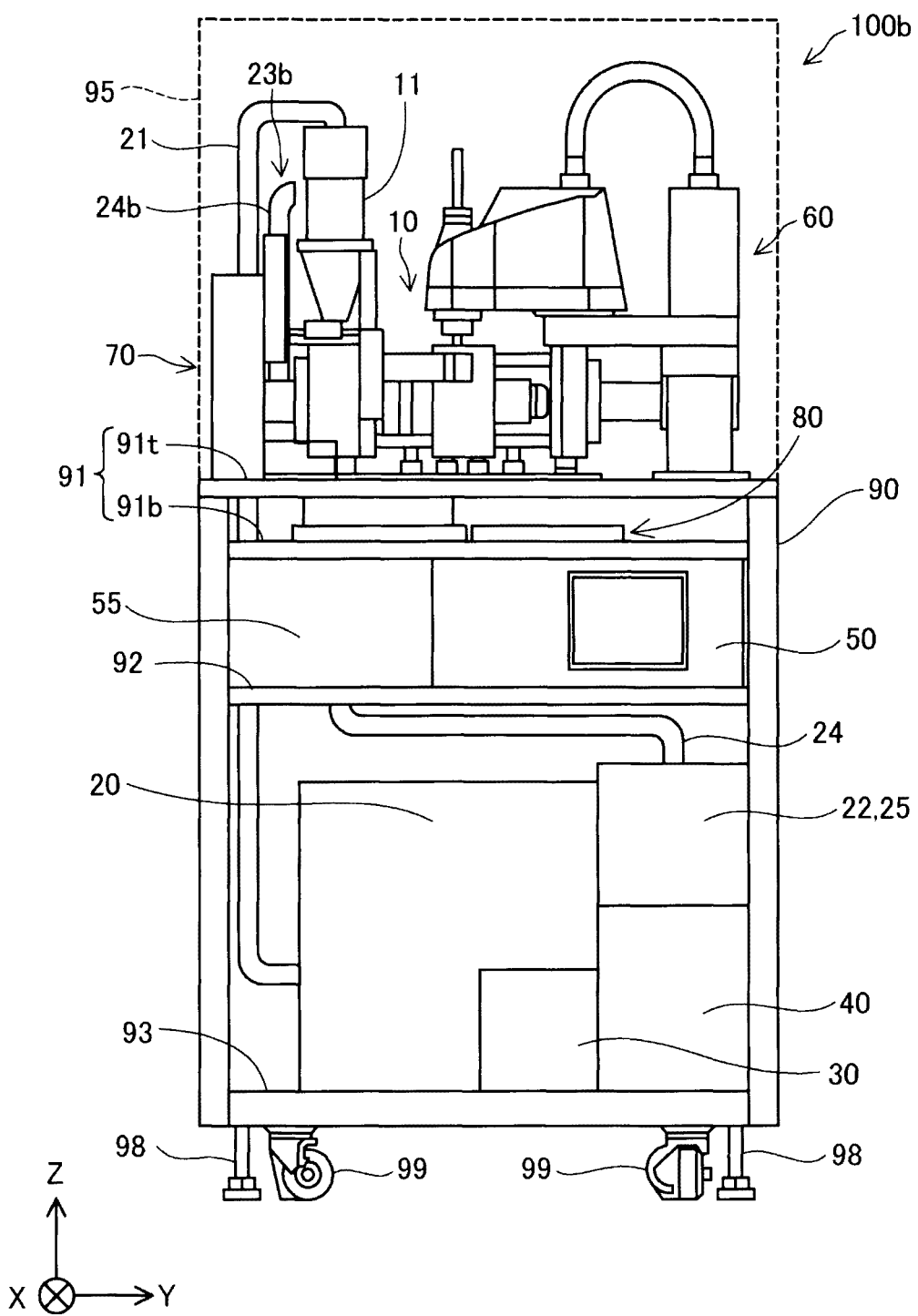
FIG. 11 is a front view showing a schematic configuration of an injection molding system according to a second embodiment.

FIG. 11 is a front view showing a schematic configuration of an injection molding system 100b according to a second embodiment. In the material drying unit 23 according to the first embodiment, the flow path 24 communicates with the inside of the material storage unit 11, and the dried compressed air warmed by the waste heat of the drive motor is introduced into the material storage unit 11, so that the material in the material storage unit 11 is directly dried. In contrast, in the second embodiment, a flow path 24b does not communicate with the material storage unit 11, and extends to a vicinity of the material storage unit 11 such that an opening portion faces an outer wall of the material storage unit 11. That is, in the second embodiment, a material drying unit 23b includes the flow path 24b at least partially in contact with the drive motor and extending to the material storage unit 11, and the blowing mechanism 25 supplies air to the flow path 24b and directs the air warmed by the waste heat of the drive motor into the outer wall of the material storage unit 11. With such a configuration, the material in the material storage unit 11 can also be dried by warming the outer wall of the material storage unit 11, so that the quality of the molded object can be enhanced. In the present embodiment, the air directed into the outer wall of the material storage unit 11 is only heated, and may not be dried.

C. Third Embodiment

Figure 12:
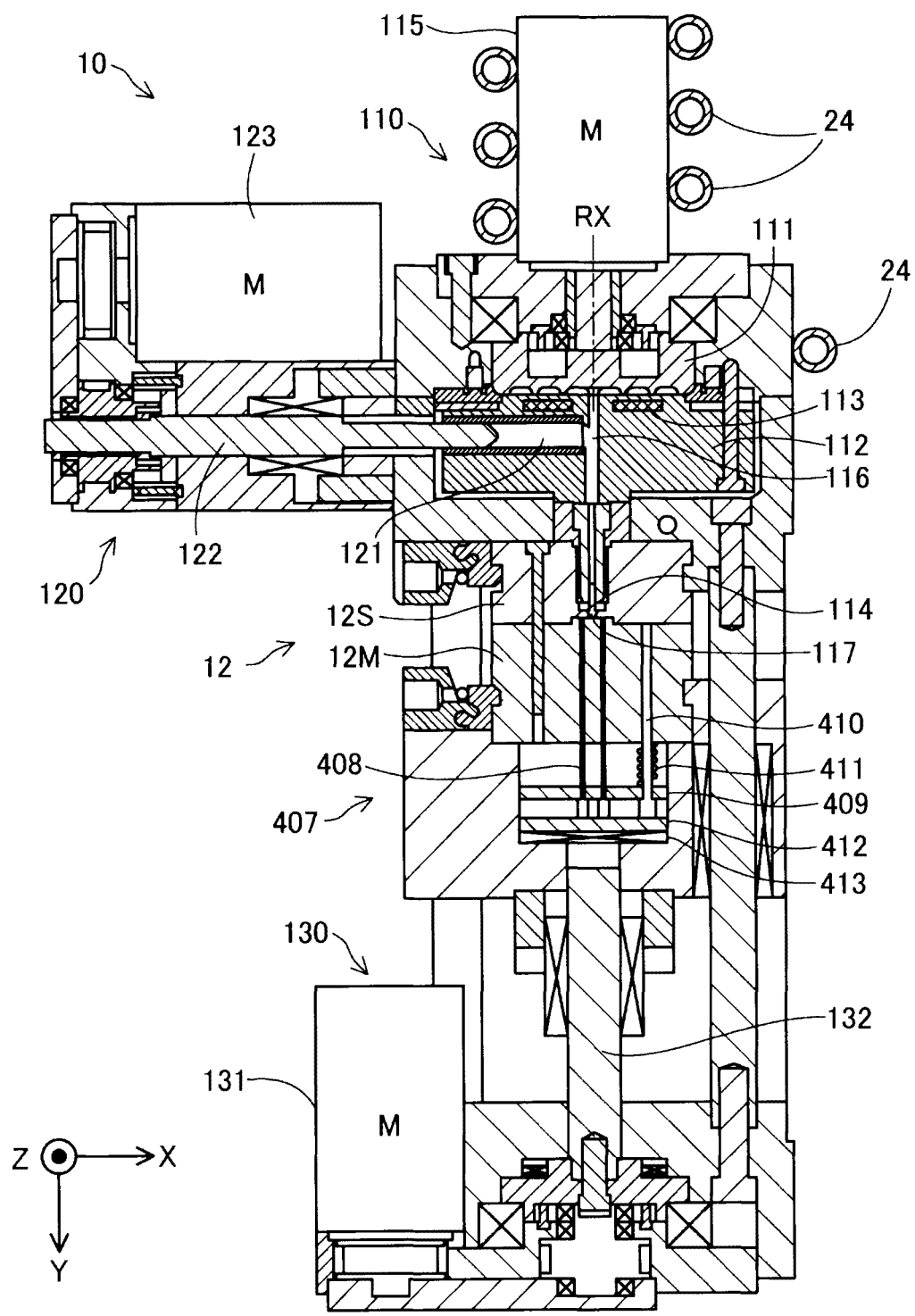
FIG. 12 is a diagram showing an arrangement of a flow path according to a third embodiment.

FIG. 12 is a diagram showing an arrangement of the flow path 24 according to a third embodiment. In the present embodiment, the flow path 24 is not only in contact with the screw drive unit 115 but also with a housing of the plasticization unit 110. Therefore, not only the waste heat of the screw drive unit 115 but also waste heat of the plasticization unit 110 can warm air in the flow path 24, and the material can be more efficiently dried.

D. Fourth Embodiment

Figure 13:
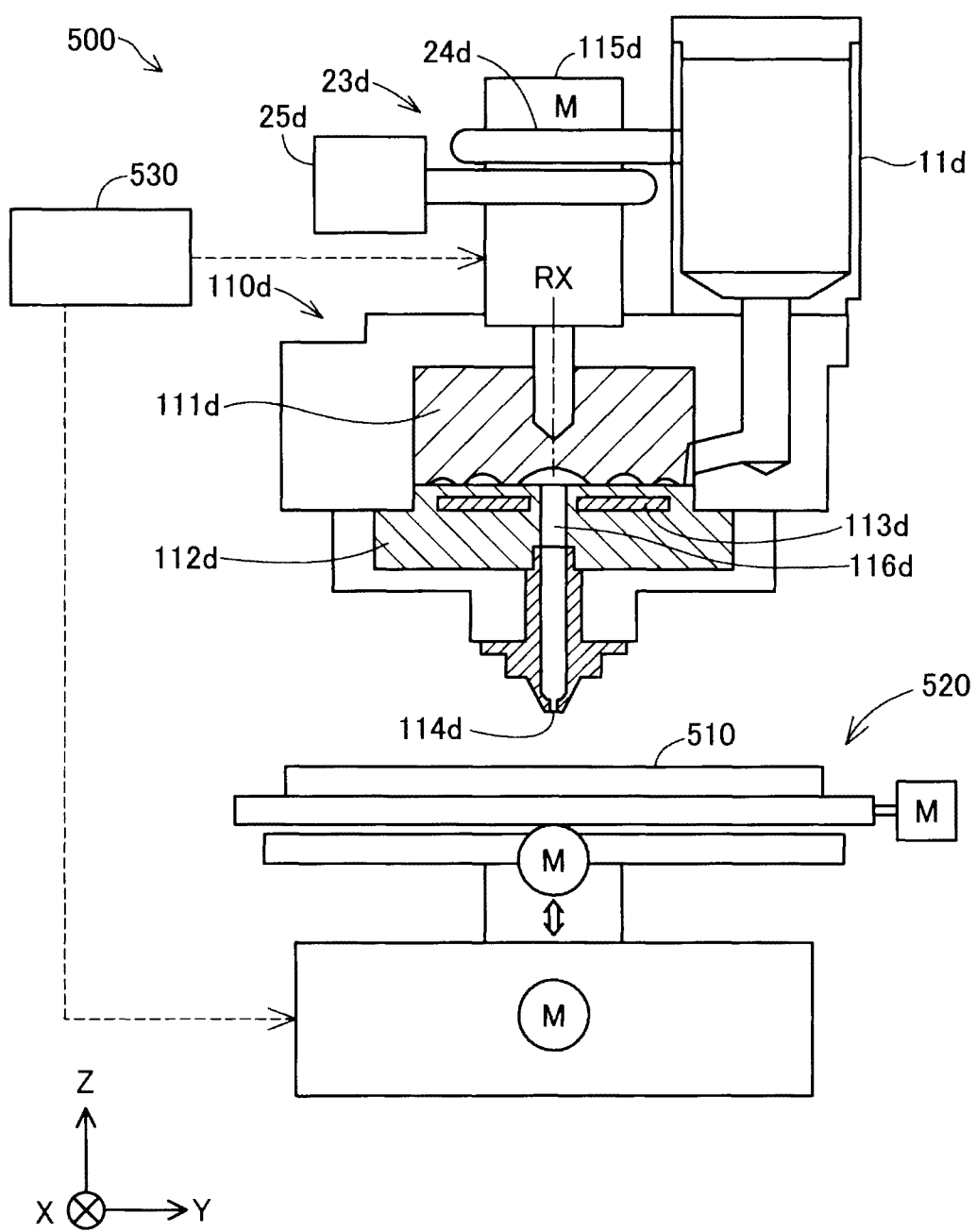
FIG. 13 is a diagram showing a schematic configuration of a three-dimensional shaping device according to a fourth embodiment.

FIG. 13 is a diagram showing a schematic configuration of a three-dimensional shaping device 500 according to a fourth embodiment. The three-dimensional shaping device 500 includes a material storage unit 11d, a screw drive unit 115d, a plasticization unit 110d, a nozzle 114d, a position changing mechanism 520, a control unit 530, and a material drying unit 23d. The screw drive unit 115d is implemented by a drive motor, and rotates a rotor 111d provided in the plasticization unit 110d. Similar to the first embodiment, the plasticization unit 110d includes the rotor 111d, a barrel 112d, and a heater 113d, and the material plasticized between the rotor 111d and the barrel 112d flows out from a communication hole 116d provided in the barrel 112d. The nozzle 114d communicates with the communication hole 116d, and discharges the material plasticized by the plasticization unit 110d toward a table 510 for shaping a three-dimensional shaped object.

The position changing mechanism 520 is configured to be able to change a relative position between the table 510 and the nozzle 114d. In the present embodiment, a position of the nozzle 114d is fixed, and the position changing mechanism 520 moves the table 510. The position changing mechanism 520 includes a three-axis positioner that moves the table 510 in three axial directions of X, Y, and Z directions by drive forces of three motors. Under the control of the control unit 530, the position changing mechanism 520 is controlled to change a relative positional relationship between the nozzle 114d and the table 510. In another embodiment, the position changing mechanism 520 may move the nozzle 114d with respect to the fixed table 510.

The control unit 530 controls the position changing mechanism 520 and the screw drive unit 115d according to previously acquired shaping data, thereby shaping a three-dimensional shaped object by discharging the material from the nozzle 114d to any position on the table 510.

Similar to the first embodiment, the material drying unit 23d collects waste heat from the screw drive unit 115d to dry the material in the material storage unit 11d. The material drying unit 23d includes a flow path 24d that partially in contact with the screw drive unit 115d, and a blowing mechanism 25d that allows air to flow through the flow path 24d. The blowing mechanism 25d is, for example, a pneumatic pump. The material drying unit 23d may have a configuration according to any one of the first to third embodiments described above.

According to the three-dimensional shaping device 500 of the fourth embodiment described above, since the material in the material storage unit 11d can be dried by the material drying unit 23d, the quality of the three-dimensional shaped object to be shaped on the table 510 can be enhanced.

E. Other Embodiments (E-1) In the above embodiments, the plasticization unit 110 provided in the injection molding device 10 plasticizes the material using the rotor 111 provided with the groove portions 202 in the end surface 201. In this regard, the plasticization unit 110 may plasticize the material using a spiral in-line screw accommodated in a cylindrical barrel.

(E-2) In the above embodiments, the injection molding device 10 moves the movable part 12M away from the fixed part 12S, so that the ejector pin 408 is protruded from the movable part 12M toward the fixed part 12S. In this regard, the injection molding system 100 may cause the ejector pin 408 to protrude from the movable part 12M by moving the ejector pin 408 itself, so that the molded object is released.

(E-3) In the above embodiments, the injection molding system 100 includes the pneumatic pump 22. In this regard, the injection molding system 100 may not include the pneumatic pump 22. The injection molding system 100 may receive the supply of compressed air from, for example, the facility of a factory.

(E-4) In the above embodiments, the flow path 24 is in contact with the screw drive unit 115 of the injection molding device 10. In addition, the flow path 24 may be in contact with at least one of the plunger drive unit 123 and the mold drive unit 131.

F. Other Aspects

The present disclosure is not limited to the embodiments described above, and may be implemented by various configurations without departing from the scope of the present disclosure. For example, in order to solve some or all of problems described above, or to achieve some or all of effects described above, technical characteristics in the embodiments corresponding to technical characteristics in aspects described below can be replaced or combined as appropriate. If the technical characteristics are not described as essential in the present description, they can be deleted as appropriate.

(1) According to a first aspect of the present disclosure, an injection molding device is provided. The injection molding device includes: a material storage unit storing a material; a drive motor; a plasticization unit including a rotor that rotates by rotation of the drive motor, a barrel facing the rotor, and a heater, and configured to plasticize and flow out the material supplied from the material storage unit; a nozzle through which the material after plasticization is injected toward a mold from the plasticization unit; and a material drying unit configured to collect waste heat of the drive motor and dry the material in the material storage unit.

According to such an aspect, since the waste heat of the drive motor can be collected and the material in the material storage unit can be dried by the waste heat, it is possible to prevent the quality of the molded object from being affected by the material in the material storage unit absorbing moisture in the air.

(2) In the above aspect, the material drying unit may include a flow path at least partially in contact with the drive motor and communicating with an inside of the material storage unit, and a blowing mechanism configured to supply air to the flow path and feed the air warmed by the waste heat of the drive motor into the material storage unit. According to such an aspect, the material in the material storage unit can be efficiently dried.

(3) In the above aspect, the material drying unit may include a flow path at least partially in contact with the drive motor and extending to the material storage unit, and a blowing mechanism configured to supply air to the flow path and direct the air warmed by the waste heat of the drive motor to an outer wall of the material storage unit. According to such an aspect, the material in the material storage unit can be dried by warming the outer wall of the material storage unit.

(4) In the above aspect, at least a part of the flow path may be further in contact with the plasticization unit. According to such an aspect, the material can be more efficiently dried.

(5) In the above aspect, the rotor may have an end surface on which a groove portion is formed, the barrel may have a facing surface facing the end surface, and a communication hole communicating with the nozzle may be formed on the facing surface, and the plasticization unit may plasticize the material supplied from the material storage unit between the rotor and the barrel by rotation of the rotor and heating by the heater. According to such an aspect, the injection molding device can be downsized.

(6) According to a second aspect of the present disclosure, an injection molding system is provided. The injection molding system includes the injection molding device according to any one of the above aspect; a robot configured to take out a molded object from the mold; an inspection device configured to inspect the molded object; and a moving mechanism configured to move a tray on which the molded object is placed to a take-out enabled position where a user takes out the tray.

According to such an aspect, since each device used in a post-process after the injection molding is provided, the convenience of the user can be improved.

(7) In the above aspect, the mold may include a fixed part, a movable part to be moved with respect to the fixed part, and an ejector pin protruding from the movable part toward the fixed part by movement of the movable part with respect to the fixed part, and the robot may take out the molded object extruded from the movable part by the ejector pin. According to such an aspect, since the ejector pin protrudes from the movable part toward the fixed part by the movement of the movable part with respect to the fixed part, the molded object can be released from the movable part without changing a position of the molded object. Therefore, it is possible to accurately take out the molded object by the robot.

The present disclosure is not limited to the above injection molding device and injection molding system, and may be implemented in various forms such as a three-dimensional shaping device, and a method for manufacturing a molded object or a three-dimensional shaped object.

What is claimed is:

1. An injection molding device comprising:
   a material storage unit storing a material;
   a screw drive motor;
   a plasticization unit including a rotor that rotates about a rotation axis by the screw drive motor, a barrel having a facing surface facing an end surface of the rotor, and a heater, the plasticization unit being configured to plasticize the material supplied from the material storage unit to produce a molten material that flows through a communication hole of the barrel, wherein a length of the rotor in a direction along the rotation axis is less than a length of the rotor in a direction perpendicular to the rotation axis;
   a nozzle through which the molten material is injected toward a mold;
   an injection control unit including an injection cylinder, a plunger and a plunger drive unit configured to drive the plunger, wherein the plunger slides inside the injection cylinder and pumps the molten material in the injection cylinder to the nozzle through the communication hole; and
   a material drying unit configured to collect waste heat of the screw drive motor and the plunger drive unit and dry the material in the material storage unit,
   wherein, the injection cylinder is couples to the communication hole, separate from the rotor, and receives the molten material from the communication hole, and wherein, the material drying unit includes:
a flow path at least partially in contact with the screw drive motor and the plunger drive unit, wherein the flow path extends to the material storage unit; and
a blowing mechanism configured to supply air to the flow path and feed the air warmed by the waste heat of the screw drive motor and the plunger drive unit into the material storage unit or to an outer wall of the material storage unit.

2. The injection molding device according to claim 1, wherein
at least a part of the flow path is further in contact with the plasticization unit.

3. The injection molding device according to claim 1, wherein
the plasticization unit plasticizes the material supplied from the material storage unit between the rotor and the barrel by rotation of the rotor and heating by the heater.

4. An injection molding system comprising:
the injection molding device according to claim 1;
a robot configured to take out a molded object from the mold;
an inspection device configured to inspect the molded object; and
a moving mechanism configured to move a tray on which the molded object is placed to a take-out enabled position where a user takes out the tray.

5. The injection molding system according to claim 4, wherein
the mold includes a fixed part, a movable part to be moved with respect to the fixed part, and an ejector pin protruding from the movable part toward the fixed part by movement of the movable part with respect to the fixed part, and
the robot takes out the molded object extruded from the movable part by the ejector pin.

6. A three-dimensional shaping device comprising:
a material storage unit storing a material;
a screw drive motor;
a plasticization unit including a rotor that rotates by rotation of the screw drive motor, a barrel having a facing surface facing an end surface of the rotor, and a heater, the plasticization unit being configured to plasticize the material supplied from the material storage unit to produce a molten material that flows through a communication hole of the barrel, wherein a length of the rotor in a direction along the rotation axis is less than a length of the rotor in a direction perpendicular to the rotation axis;
a nozzle through which the molten material is discharged toward a table;
an injection control unit including an injection cylinder, a plunger and a plunger drive unit configured to drive the plunger, wherein the plunger slides inside the injection cylinder and pumps the molten material in the injection cylinder to the nozzle through the communication hole; and
a material drying unit configured to collect waste heat of the screw drive motor and the plunger drive unit and dry the material in the material storage unit,
wherein, the injection cylinder is couples to the communication hole, separate from the rotor, and receives the molten material from the communication hole, and
wherein, the material drying unit includes:
a flow path at least partially in contact with the screw drive motor and the plunger drive unit, wherein the flow path extends to the material storage nit; and
a blowing mechanism configured to supply air to the flow path and feed the air warmed by the waste heat of the screw drive motor and the plunger drive unit into the material storage unit or to an outer wall of the material storage unit.

\* \* \* \* \*